(12) United States Patent
Chan et al.

(10) Patent No.: US 6,957,385 B2
(45) Date of Patent: Oct. 18, 2005

(54) WORLDWIDE NUMBER FORMAT FOR A SPREADSHEET PROGRAM MODULE

(75) Inventors: Marise Chan, Redmond, WA (US); Barry C. McCord, Bellevue, WA (US); Kenneth E. Schmidt, Mercer Island, WA (US); James Sukhabut, Redmond, WA (US); Christopher C. Yu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 09/755,432

(22) Filed: Jan. 5, 2001

(65) Prior Publication Data

US 2002/0091731 A1    Jul. 11, 2002

(51) Int. Cl.[7] .............................................. G06K 9/36
(52) U.S. Cl. ...................................... 715/504; 715/523
(58) Field of Search .......................... 707/201; 341/63; 705/10; 715/503, 504; 364/715; 704/8; 717/1

(56) References Cited

U.S. PATENT DOCUMENTS

| | | | | |
|---|---|---|---|---|
| 5,608,898 A | * | 3/1997 | Turpin et al. ............... | 707/201 |
| 5,657,259 A | * | 8/1997 | Davis et al. ................ | 708/204 |
| 6,104,325 A | * | 8/2000 | Liaw et al. ................. | 341/63 |
| RE37,722 E | * | 5/2002 | Burnard et al. ............. | 713/1 |
| 6,496,793 B1 | * | 12/2002 | Veditz et al. ................ | 704/8 |
| 2003/0028420 A1 | * | 2/2003 | DeBiasse ..................... | 705/10 |

OTHER PUBLICATIONS

Microsoft Excel 2000 (9.0.4402 SR-1), copyright 1985-1999. (screen shots of Help screens and application screeens).*

(Continued)

*Primary Examiner*—William Bashore
*Assistant Examiner*—Gautam Sain
(74) *Attorney, Agent, or Firm*—Merchant & Gould, LLC

(57) ABSTRACT

A worldwide number format for use with a spreadsheet program module is disclosed. The worldwide number format includes a locale specifier comprising a number shape, a calendar type and a locale identification (LCID). The worldwide number format also includes a base number format and a value. The LCID is used to categorize different parts of the world. Primarily, the LCID categorizes different parts of the world by language such as English, German, French, Thai, Arabic, etc. The LCID is used to determine what language to display month names, month abbreviations, weekday names, weekday abbreviations, time designations such as AM/PM, etc. The calendar type supports both Gregorian and non-Gregorian calendars. Calendar type is a value to indicate which calendar should be used to calculate the date from the value. The number shape is a value that indicates what shape in which to represent the number. In other words, number shape refers to the manner of writing numbers and the digit shape to use to represent a number. For example, some countries prefer to see numbers written out.

19 Claims, 4 Drawing Sheets

OTHER PUBLICATIONS

Microsoft Windows NT version 4.0 (Build 1381; Service Pack 6, RC 1.3), copyright 1981-1998 (screen shots of Regional Settings Properties).*

Microsoft Excel 2000 (9.0.4402 SR-1), copyright 1985-1999. (screen shots of Help screens and applicaiton screeens)(p. 8,9).*

*Spreadsheet moves*; R. Piper; *Micro Decision* 36 (Oct. 1984) pp. 53-56 supl.

*An experimental study of people creating spreadsheets*; Polly S. Brown and John D. Gould; *ACM Trans. Inf. Syst.* 5,3 (Jul. 1987) pp. 258-272.

*Toward a logical/physical theory of spreadsheet modeling*; Tomas Isakowitz, Shimon Schocken and Henry C. Lucas; *ACM Trans. Inf. Syst.* 13, 1 (Jan 1995) pp. 1-37.

*User customization of a word processor*; Stanley R. Page, Todd J. Johnsgard, Uhl Albert and C. Dennis Allen; *ConferenceProceedings on Human Factors in Computing Systems* (1996) pp. 340-346.

*Multilingual programming: Coordinating programs, user interfaces, on-line help and documentation*; Gary Perlman; Proceedings of the Fourth International Conference on Systems Documentation (1985) pp. 123-129.

* cited by examiner

WORLDWIDE NUMBER FORMAT FOR A SPREADSHEET PROGRAM MODULE

TECHNICAL FIELD

The invention generally relates to electronic spreadsheet program modules, and more particularly relates to a worldwide number format for use with a spreadsheet program module.

BACKGROUND

Companies are increasingly becoming multinational. One difficulty multinational companies have is dealing with the numerous number formats that are used throughout the world. Dealing with the numerous number formats is a particular area of concern for designers of spreadsheet program modules. Spreadsheets inherently involve numbers and are often used to make important business and legal decisions. Therefore, it is important that spreadsheets handle numbers properly throughout the world.

Some spreadsheet program modules have different versions depending upon the country of use (such as a German version, a U.S. version, etc.). The version determines how numbers are to be displayed to the user. For example, if a Japanese user creates a spreadsheet using a Japanese version of a spreadsheet application program module and sends it to a U.S. user using a U.S. version of the spreadsheet application program module, the numbers in the spreadsheet will appear differently in the U.S. version than in the Japanese version. The U.S. version makes a best approximation as to how to display the numbers in the U.S. Sometimes, however, it is important that the spreadsheet appear exactly the same to the Japanese user and the U.S. user. Sometimes the approximation will change the appearance of the spreadsheet and cause users to doubt the integrity of the spreadsheet. Therefore, it is extremely important in many cases that a spreadsheet appear as it was originally drafted.

Thus, there is a need for a method and system for simplifying the handling of numbers specific to individual countries.

SUMMARY OF THE INVENTION

The present invention meets the above-described needs by providing a worldwide number format for use with a spreadsheet program module. The worldwide number format includes a locale specifier comprising a number shape, a calendar type and a locale identification (LCID). The worldwide number format also includes a base number format and a value. The LCID is used to categorize different parts of the world. Primarily, the LCID categorizes different parts of the world by language such as English, German, French, Thai, Arabic, etc. The LCID is used to determine what language to display month names, month abbreviations, weekday names, weekday abbreviations, time designations such as AM/PM, etc. The calendar type supports both Gregorian and non-Gregorian calendars. Calendar type is a value to indicate which calendar should be used to calculate the date from the value. The number shape is a value that indicates what shape in which to represent the number. In other words, number shape refers to the manner of writing numbers and the digit shape to use to represent a number. For example, some countries prefer to see numbers written out.

In another aspect, the invention comprises a new "Format Cells" dialog. The user may select a category and a locale from a dropdown menu. In association with each category and locale, a number of different types for displaying the category will be displayed. For example, if the user selects the locale "English (United States)" and the category "Date", then the types displayed may be "3/14", "3/14/98", "03/14/98", "Mar-98", and "March-98". The user may then select one of these types to display their number.

That the invention improves over the drawbacks of prior number formats and accomplishes the advantages described above will become apparent from the following detailed description of the exemplary embodiments and the appended drawings and claims.

DETAILED DESCRIPTION OF EMBODIMENTS OF THE INVENTION

An embodiment of the present invention will be incorporated into the "EXCEL 10" spreadsheet program module manufactured by Microsoft Corporation of Redmond, Wash. Briefly described, in one embodiment, the invention is a worldwide number format for use with a spreadsheet program module. The worldwide number format includes a locale specifier comprising a number shape, a calendar type and a locale identification (LCID). The worldwide number format also includes a base number format and a value (both the base number format and value were available in previous versions of "EXCEL").

In one embodiment, the invention comprises a new "Format Cells" dialog. The user may select a category and a locale from a dropdown menu. In association with each category and locale, a number of different types for displaying the category will be displayed. For example, if the user selects the locale "English (United States)" and the category "Date", then the types displayed may be "3/14", "3/14/98", "03/14/98", "Mar-98", and "March-98". The user may then select one of these types to display their number.

Exemplary Operating Environment

Figure 1:
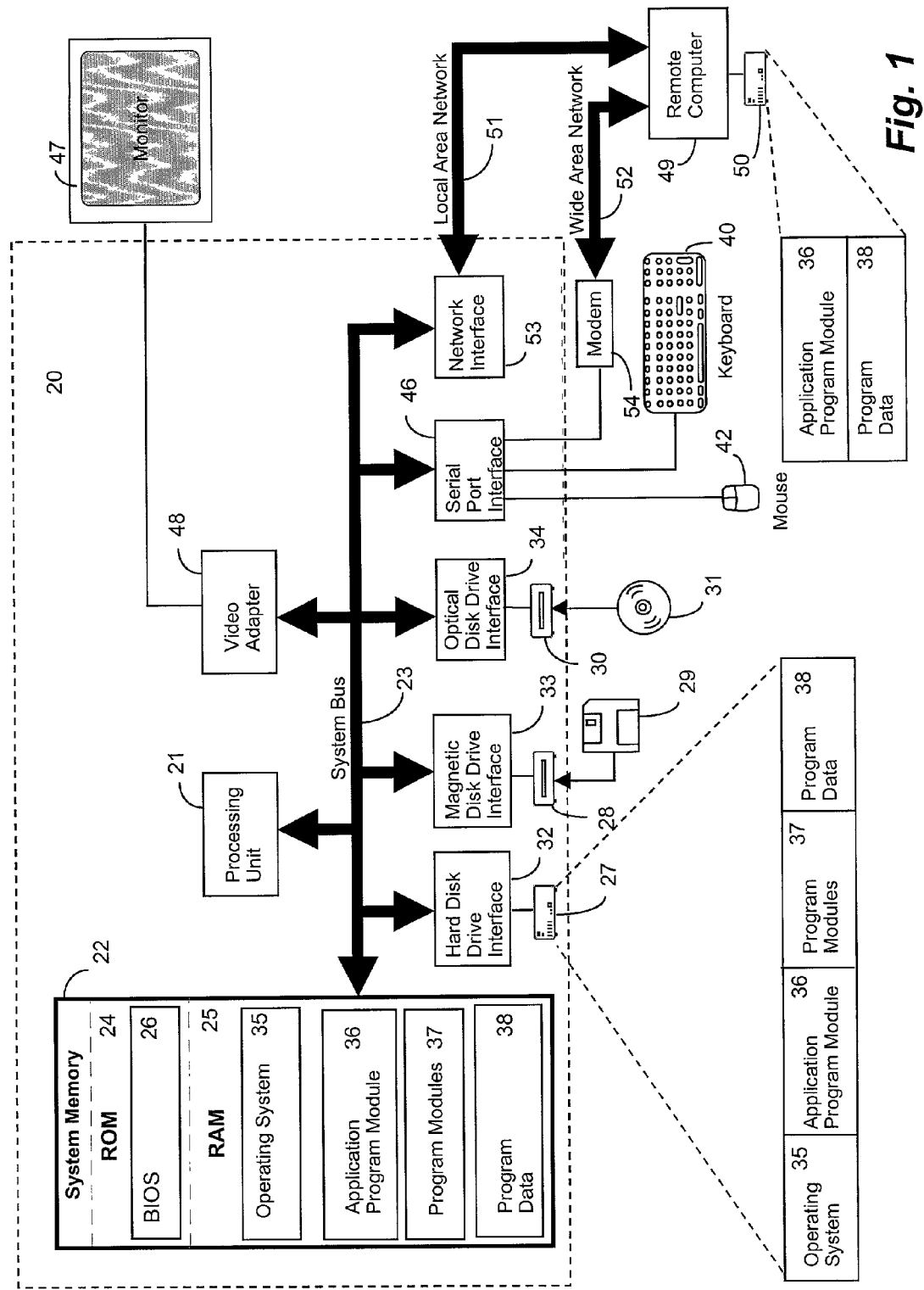
FIG. 1 is a block diagram of a personal computer that provides the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, an application program module 36, such as Microsoft's "EXCEL 10" spreadsheet program module, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention expands upon the underlying number format that has been in the "EXCEL" spreadsheet application program module by expanding the is number format to include a locale specifier that makes it more flexible in supporting different cultural standards.

Prior Underlying Number Format

Before describing an embodiment of the present invention, a brief description of "EXCEL"'s underlying number format is helpful. Suppose a user uses a Format Cells dialog to enter a date of March-98 into a cell of a spreadsheet. The base number format of March-98 would be stored as MMMM-YY with "MMMM" specifying the full month and "YY" specifying the last two digits of the year. Dates are stored as raw numbers in "EXCEL". Thus, stored along with the base number format is a raw number, or value. In "EXCEL", this raw number is calculated as the number of days, minutes and seconds since Jan. 1, 1900. This raw number is calendar neutral. Thus, the storage of the date comprises a base number format and a raw number or value.

The present invention expands on the underlying number format of "EXCEL" to provide a worldwide number format as will be understood from the following description.

The Locale Specifier

Prior versions of the "EXCEL" spreadsheet program module have several number formats that render differently depending on what language and version of "EXCEL" the user is using. Examples of these formats include DBNUM, Era/emperor calendars, cases with localized AM/PM designations, cases with localized weekday/month names and complex script dates.

To attack these issues, in one embodiment, the present invention adds a locale specifier to the ambiguous number format so that it functions properly worldwide.

This locale specifier also enables additional future flexibility to accommodate new locales and additional number formats.

The locale specifier includes a locale identification (LCID), a calendar type and a number shape. The locale specifier and the value for a number are stored and used to render a number in its appropriate form. The locale specifier is also typically stored with a base number format, such as M/D/YY.

The locale identification (LCID) has been used in previous versions of "EXCEL" with currencies to determine the proper currency symbol to display based upon the language and country identified by the locale identification. For example if the LCID indicates French (France) then currency will be displayed as francs, if the LCID indicates English (United States) then currency will be displayed as dollars, if the LCID indicates English (United Kingdom) then currency will be displayed as pounds, etc. The present invention uses the LCID to categorize different parts of the world. Primarily, the LCID categorizes different parts of the world by language such as English, German, French, Thai, Arabic, etc. The locale identification, or LCID, is used to determine what language to display month names, month abbreviations, weekday names, weekday abbreviations, time designations such as AM/PM, etc. The locale identification is also used to disambiguate some of the DBNUM formats of previous versions of "EXCEL" and used to disambiguate Thai, Taiwan, Japan, etc. dates. The LCID is also typically used as tie-breaking mechanism if the number shape and calendar type (both described below) do not make it clear how to display a number. For example, suppose the date is Tuesday, Feb. 10, 1999. The LCID is used to determine the language in which to display Tuesday and February. The LCID may also be used to determine whether to display a number in the system short date, long date and time formats. For example, when a cell is formatted as long date, its format will change according to the WINDOWS operating system Long Date format setting in the Date tab of the Regional Options control panel.

The calendar type supports both Gregorian and non-Gregorian calendars. Calendar type is a value to indicate which calendar should be used to calculate the date from the value. The present invention supports numerous different calendar types including Thai Buddhist calendars and Hijri calendar, just to name a few. Using the value and the origin for the calendar type a calendar specific date may be calculated and displayed. Calendar type only applies to the Date and Time categories.

The number shape is a value that indicates what shape in which to represent the number. In other words, number shape refers to the manner of writing numbers and the digit shape to use to represent a number. For example, some countries prefer to see numbers written out. Number shapes may refer to ASCII numbers, Arabic numbers, Chinese numbers, Korean numbers, Japanese numbers, just to name a few. Number shape applies to all categories of numbers. For example, for dates and times, the number shape indicates how the digits for the day, month, and year will be displayed.

An example of a locale specifier with a base number format of "M/D/YY" is: [$-021C0404]M/D/YY The 0404 is the locale identification, or LCID. The LCID is typically in hex format. If the format for a number needs a locale designation, the language for the number will be encapsulated into that LCID.

The 1C is the calendar type and is typically in hex format. The calendar type is used to represent whether the calendar type for the number is Gregorian, Japanese era, Hijri, etc. The calendar type is ignored if the base number format of M/D/YY is a base number format that is not a date such as "#,###.##".

The 02 is the appropriate number shape/number style and is typically in hex format.

Because the calendar type and number shape are hex digits, the present invention may support up to 256 calendar types and 256 number shapes.

The locale specifier provides backwards compatibility (it functions with previous versions of "EXCEL" because the new calendar type and number shape elements are ignored by these versions and, consequently, do not affect the base number format). Thus, to render a number, previous versions of "EXCEL" may simply look at the base number format and value to render a number. The locale specifier also requires no modification of the existing "EXCEL" Biff file format so previous versions of "EXCEL" can directly open new files created by "EXCEL 10".

Handling the Locale Specifier

Figure 2:
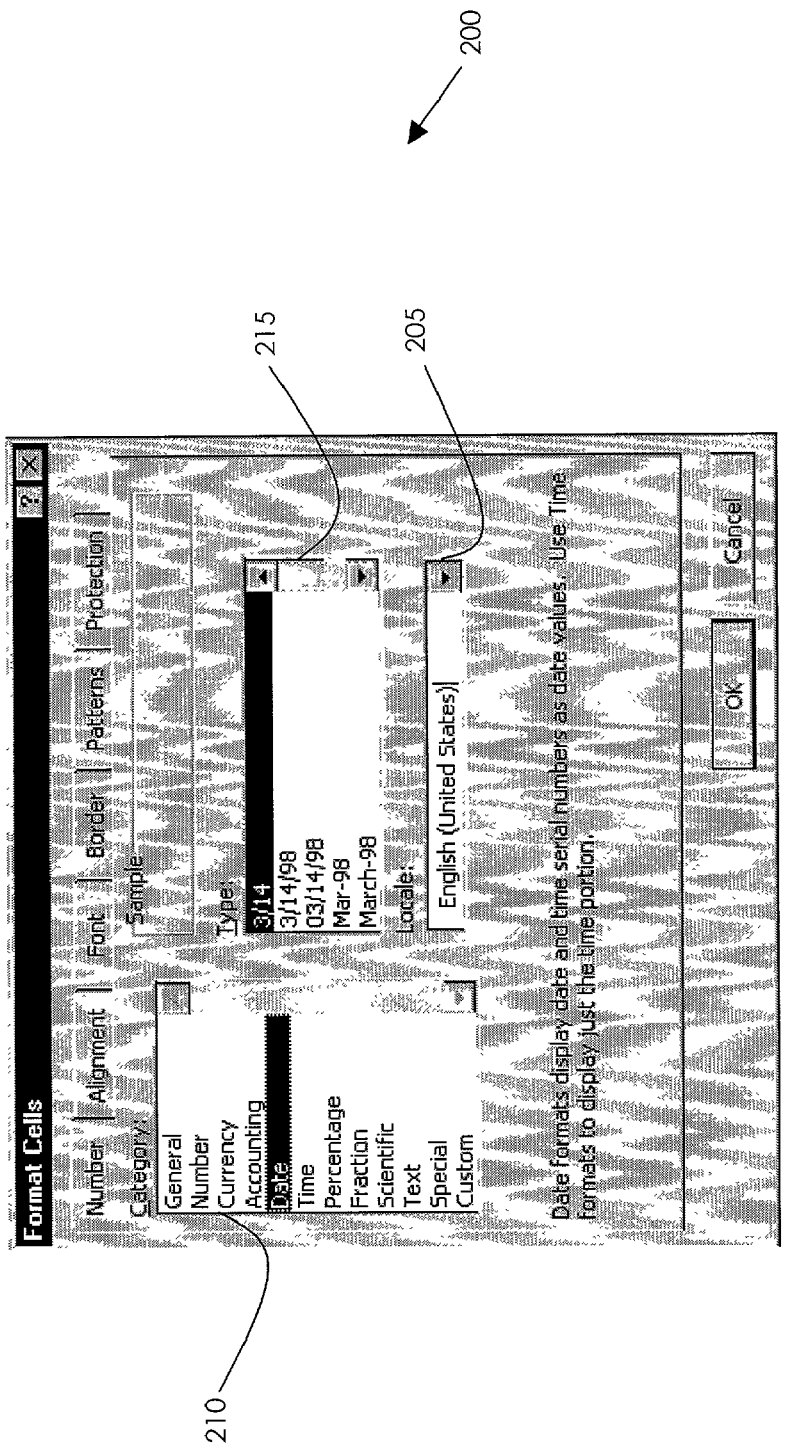
FIG. 2 is an illustration of a Numbers tab (Format Cells dialog) in accordance with an embodiment of the present invention.

The present invention maintain backwards compatibility but also provides a path for additional number formats in the future. As a result, the application program module will continue to write out and store the appropriate DBNUM and representative letters (like GGE) when a format is selected from the Format Cells dialog (FIG. 2). This writing will not be done on the fly but rather stored with each format in the Format Cells dialog. In other words, formats that are internationally ambiguous will simply add the locale specifier to the front of the existing format in "EXCEL". In cases of conflicts between the previous format for "EXCEL" and the number shape and calendar type, the number shape and calendar type in the locale specifier controls.

The following example will provide an example of the base format and locale specifier. [$-021C0404]M/D/YY is an example of a locale specifier followed by a date base format. "0404" is the LCID in hex format. "1C" is the calendar type in hex format. The calendar type is used to represent whether the calendar type for the number is Gregorian, Japanese era, Hijri, etc. The calendar type is ignored if the value M/D/YY is replaced by numbers such as #, ###.##. "02" is an appropriate number shape/number style in hex format.

The application program module will read the locale specifier. If it is deemed valid with a supported combination of calendar type, number shape and locale identification, it will then apply the appropriate format. The application program module will fall back on the letter representation and base number format if it cannot validate the locale specifier.

The locale specifier can be used with any custom format. Format categories (Format.Cell dialog) of particular interest are:

Currency (LCID argument, numeral shapes argument)
Date (LCID argument, numeral shapes argument, calendar argument)
Number (numeral shapes argument).

The previous paragraph describes what parts of the locale specifier apply to what types of number formats.

Having described a locale specifier used to implement an embodiment of the present invention, a Numbers tab (Format Cells dialog) 200 will be described below.

Locale Dropdown Menu

Referring now to FIG. 2, an illustration of a Numbers tab (Format Cells dialog) 200 in accordance with an embodiment of the present invention will be described. The Format Cells tabs allow a user of the "EXCEL" spreadsheet program module to format the cells in a spreadsheet by choosing formatting attributes for numbers, alignment, font, border, patterns and protection. In an embodiment of the present invention, the Numbers tab 200 has been enhanced with new features.

The Numbers tab 200 in accordance with an embodiment of the present invention comprises a category menu 210 listing a plurality of categories. The category menu 210 allows a user to select a category for a number such as general, number, currency, accounting, date, time, percentage, fraction, scientific, text, special and custom.

In a preferred embodiment, a Locale dropdown menu 205 is active and displayed for the Date, Time and Special categories. When selected, the Locale dropdown menu displays over 100 different locales of number formats. A user may select one of these formats for a category of number. The first entry in the dropdown locale menu is the locale determined by the system user locale (Your Locale setting in General tab of Regional Options control panel). For example, in FIG. 2, the first entry is "English (United States)".

After a category is selected from the category menu 210 and a locale is selected in the Locale dropdown menu 205, a number of types are listed in Type menu 215. The spreadsheet application program module stores these types in a look up table and displays these types based on the category and locale selected by the user.

Suppose a user enters the date "1/5/00" into cell A1 of a spreadsheet. This date is stored as a value (such as 36,530) and a number format (such as m/d/yy). Suppose the user is not happy with this format and wants to see: "5 de Jan de 2000". Using an embodiment of the present invention, the user opens the Format Cells dialog with cell A1 selected. From the Locale dropdown menu 205, the user chooses Spanish (Traditional Sort). The spreadsheet program module finds in a lookup table a number of sample formats stored for the date category and the Spanish (Traditional Sort) locale. The spreadsheet program module displays the list of examples of these sample formats in the type menu 215. Suppose one of the examples is "14 de marzo de 2001" and the user chooses this example from the type menu. The underlying number format for this example may look something like this: [$-0000040A] dd "_de_" mmmm "_de_" yyyy. Note that this underlying number format has a number shape of "00" referring to Arabic numerals and a calendar type of "00" referring to the Gregorian calendar. Arabic numerals and Gregorian calendar are defaults.

Note that the user is able to choose precomposed samples that are specific to a user in Spain and the user does not have to know the details of the underlying format. Of course, a user can expose the underlying format by choosing Custom in the Category menu 210 and can edit the underlying format to suit the user's needs.

Decimal/Thousands Separator

Figure 3:
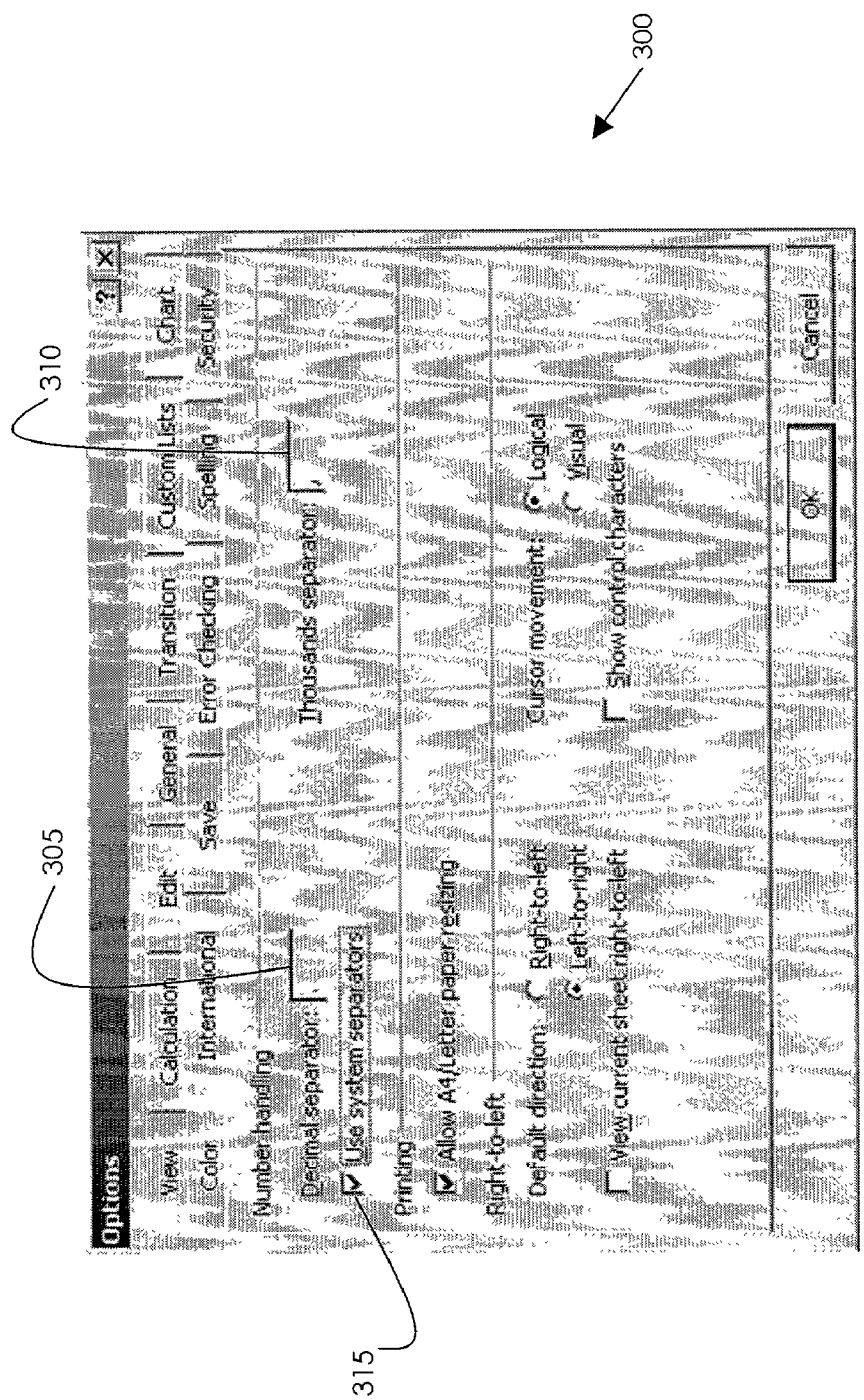
FIG. 3 is an International tab (Tools.Options dialog) in accordance with an embodiment of the present invention.

The present invention, in one embodiment, also comprises a plurality of dropdown menus for setting the decimal and thousands separators in the International tab of the Tools_Options dialog. The International tab 300 is illustrated in FIG. 3 and will be described below. In previous versions of the "EXCEL" spreadsheet program module, changing the separators required the user to change them through settings in the Numbers tab of the Regional Options control panel. In this embodiment, the invention allows the user to change the separators independent of the system and other applications.

The International tab 300 includes a Decimal separator edit box 305, a Thousands separator edit box 310 and a Use system separators checkbox 315. Checking the Use system separators checkbox means that "EXCEL" will use decimal and thousands separators specified in the WINDOWS operating system Control Pane's Regional Options dialogNumbers tab. When unchecked, the user may enter the desired decimal and thousands separators (limited to one character each) in the edit boxes.

The user may not pick the same decimal and thousands separator (except for selecting Use system separators and having it specified in the system). If the user does pick the same decimal and thousands separator, then the following alert will be displayed: "The decimal separator and the thousands separator cannot match. Please select a non-matching pair."

The settings for the decimal and thousands separator will be saved in 3 registry keys:
HKCU/Software/Microsoft/Office/10.0/Excel/Options
Value 1: String DecimalSeparator
Value 2: String ThousandsSeparator
Value 3: DWORD UseSystemSeparators If a user enters the same character into both registry keys, the application program module will use system separators. If a user attempts to enter the same character into both VBE properties, the application program module will use system separators.

Rendering Numbers with Worldwide Number Format

Figure 4:
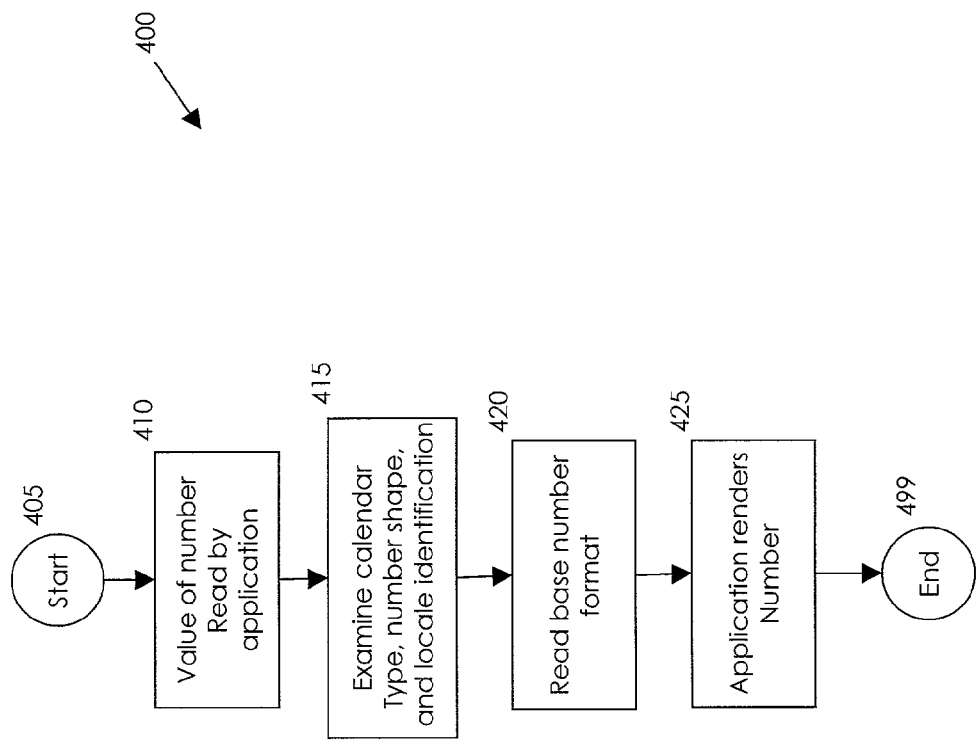
FIG. 4 is a logic flow diagram illustrating a method for rendering numbers with a worldwide number format in accordance with an embodiment of the present.

Those skilled in the art will appreciate that the logic flow diagram of FIG. 4 is executed by the processing unit 21 (FIG. 1) in response to instructions that have been incorporated into the application program module 36.

Referring now to FIG. 4, a logic flow diagram illustrating a method for rendering numbers with a worldwide number format in accordance with an embodiment of the present will be described.

The method 400 begins at start step 405 and proceeds to step 410 when a number needs to be rendered by a spreadsheet program module such as application program module 36.

At step 410, the value of the number to be rendered is read by the application program module. The method 400 then proceeds to step 415.

At step 415, the spreadsheet program module 36 examines the calendar type, number shape and locale identification of a locale specifier for the number to be rendered. The method then proceeds to step 420.

At step 420, the base number format for the number to be rendered is read by the application program module. The method then proceeds to step 425.

At step 425, the number is rendered by the application program module. The method then ends at step 499.

It should be understood that the present invention leverages existing custom number format architecture and provides users with the ability to easily use worldwide number formats. The invention retains backward compatibility and provides for future support of additional calendar types, number shapes and locales.

The foregoing description mainly focused on Date formats. However, the present invention also applies to numbers in the Time and Special formats as well. The locale specifier is most useful with date, time, currency and numbers, but could be applied to any custom format. It should be understood that although the foregoing description describes the invention as part of a spreadsheet program module the present invention may be part of any application program module that uses number formatting.

Having described embodiments of the present invention, it will be understood by those skilled in the art that numerous uses of the present invention are possible. Some examples include the following scenarios:

A management consultant in the United States needs to cater to his German clients. Using an embodiment of the present invention, he provides analyses and recommendations in a clear and localized manner by formatting his numbers to support German date and postal code formats.

A company based in Finland merges with a company based in the U.S. The CFO needs to publish the annual report for both American and European customers. After addressing the differences in accounting rules, the CFO simply formats his report using both local date formats and the decimal/thousands separators for the U.S. and Finland.

It should be understood from the foregoing description that the present invention provides numerous benefits. The invention reduces the limitations on the number formats a user can enter because of the language/locale of the application program module. The invention provides a logical place to look for number formats to work with different languages. Multinational corporations may roll out throughout the world an application program module implementing the present invention and users will not lose the number formats they depend upon. Users can apply any locale's number formats to any spreadsheet to conduct global business.

It should be understood that an embodiment of the present invention may be a dynamic link library, or dll, that is used to generate global number formats. Applications program modules could use this dll rather than having to generate number formats themselves. In another embodiment of the present invention a wizard may be used to guide a user when choosing the locale, number shape and calendar type for a number so that the user may easily make custom number formats suiting their needs.

From the user's perspective, the invention provides access to different number formats so that numbers may be rendered in a number format preferred by the user. The invention provides the user with accessibility to customize number formats in such a way that the user can mix and match locale identifiers, number shapes, and calendar types.

It should be understood that an embodiment of the present invention provides a worldwide number format that allows users to apply date, time and other formats specific to locales all over the world to numbers regardless of what language/locale of the spreadsheet application program module the customer has.

As should be understood from the foregoing description, number formats are commonly found in every software application that deals with numbers and dates. Each application typically has its own code to generate these formats. Each country has its own specific numeric formats. These numeric formats vary in number order, decimal/thousands separator, number shape, calendar type and number of decimal digits. The present invention is an application implementation of a user-accessible model to manipulate these variables in a simple and locally specific manner.

It should be understood that the foregoing pertains only to the preferred embodiments of the present invention, and that numerous changes may be made to the embodiments described herein without departing from the spirit and scope of the invention.

We claim:

1. A computer-implemented method for rendering a number in a spreadsheet program module, comprising the steps of:
    determining the value of the number;
    reading a worldwide number format of the number wherein the worldwide format includes a locale specifier of the number and a base format of the number; and
    using the base format and the locale specifier to render the number therein applying the worldwide number format to the number;
    wherein the locale specifier comprises:
        a locale identification used to categorize different parts of the world and determine what language in which to render the number independent of regional settings associated with the spreadsheet program module;
        a number shape including a number shape value that indicates what shape in which to render the number; and
        a calendar type including a calendar type value that indicates which calendar should be used to calculate a date from the value of the number.

2. The method of claim 1 wherein the number shape value indicates that the number is to be rendered as written out text.

3. The method of claim 1, wherein the worldwide number format is stored in association with the value of the number.

4. The method of claim 1, wherein the number shape refers to one of ASCII numbers, Arabic numbers, Chinese numbers, Korean numbers, and Japanese numbers.

5. The method of claim 1, wherein the number shape comprises a hex digit.

6. The method of claim 1, wherein the number shape refers to at least one of a manner of writing numbers and a digit shape in which to render the number.

7. A computer-implemented method for entering a number into a cell in an electronic spreadsheet of a spreadsheet application program module, the method comprising the steps of:
    receiving a category indication for the number from a selection via a Category dropdown menu of the Format Cells dialog within the spreadsheet application program module;
    receiving a locale identifier only for the number from a selection via a Locale dropdown menu of the Format Cells dialog within the spreadsheet application program module;
    cross-referencing the category indication and locale identifier independent of regional format settings to determine a plurality of sample number formats with a plurality of underlying number formats;
    displaying the plurality of sample number formats;
    receiving an indication of a selection of one of the plurality of sample number formats; and
    storing the underlying number format of the selected sample number format in association with a value for the cell, wherein the underlying number format of the selected sample number format and the value for the cell comprise the number.

8. The method of claim 7 wherein the step of displaying the plurality of sample number formats comprises displaying the plurality of sample number formats in a Type menu of the Format Cells dialog.

9. The method of claim 8 wherein the step of receiving an indication of a selection of one of the plurality of sample number formats comprises an indication from the Type menu of the Format Cells dialog.

10. A computer-readable medium having computer-executable instructions for performing the steps recited in claim 7.

11. The method of claim 7, wherein the category indication and the locale identifier determine a calendar type of the number independent of the regional format settings.

12. The method of claim 7, wherein the category indication and the locale identifier determine a number shape of the number independent of the regional format settings.

13. A computer-implemented method for generating a graphical object including a Format Cells dialog box for choosing the number format of a number in an electronic spreadsheet application program module, the method comprising:
    generating a Category menu comprising a plurality of number categories to select for the number;
    generating a Locale menu comprising a plurality of locales to select as the locale identification for the number independent of at least one of operating system regional settings and a language version of the electronic spreadsheet application program module; and generating a Type menu comprising a plurality of sample display formats to select to display the number.

14. The method of claim 13 wherein the plurality of sample display formats is generated in response to a selection of one of the plurality of number categories and a selection of one of the plurality of locales.

15. The method of claim 13 wherein each of the plurality of sample display formats has a corresponding underlying number format.

16. The method of claim 15 wherein a selection of one of the plurality of sample display formats causes the corresponding underlying number format of the selected sample display format to be applied to the number independent of at least one of the regional settings and the language version of the electronic spreadsheet application program module.

17. The method of claim 15, wherein the underlying number format includes at least one of a calendar type of the number and a number shape of the number.

18. The method of claim 17, wherein the number shape is determined based on the selection of one of the plurality of number categories and the selection of one of the plurality of locales.

19. The method of claim 17, wherein the calendar type is determined based on the selection of one of the plurality of number categories and the selection of one of the plurality of locales.

* * * * *

UNITED STATES PATENT AND TRADEMARK OFFICE
CERTIFICATE OF CORRECTION

PATENT NO. : 6,957,385 B2  Page 1 of 1
DATED : October 18, 2005
INVENTOR(S) : Chan et al.

It is certified that error appears in the above-identified patent and that said Letters Patent is hereby corrected as shown below:

Column 10,
Line 45, after "comprises" insert -- receiving --.

Signed and Sealed this

Eighteenth Day of April, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,957,385 B2 | Page 1 of 1 |
| APPLICATION NO. | : 09/755432 | |
| DATED | : October 18, 2005 | |
| INVENTOR(S) | : Marise Chan et al. | |

It is certified that error appears in the above-identified patent and that said Letters Patent is hereby corrected as shown below:

On the title page, item (56), under "Other Publications", in column 2, line 3, delete "screeens" and insert -- screens --, therefor.

On page 2, item (56), under "Other Publications", in column 1, line(s) 5-6, delete "applicaiton screeens)(p. 8,9)" and insert -- application screens) (p. 8,9) --, therefor.

On page 2, item (56), under "Other Publications", in column 2, line 6, delete "ConferenceProceedings" and insert -- Conference Proceedings --, therefor.

In column 4, line 12, after "the" delete "is".

In column 5, line 37, after "[$-021C0404]M/D/YY" insert -- . --.

In column 10, line 19, in Claim 7, after "of" delete "the".

In column 10, line 27, in Claim 7, after "and" insert -- the --.

In column 10, line 45, in Claim 9, after "comprises" insert -- receiving --.

Signed and Sealed this

Fourth Day of August, 2009

JOHN DOLL
*Acting Director of the United States Patent and Trademark Office*